(12) United States Patent
Brasuel

(10) Patent No.: US 9,420,762 B2
(45) Date of Patent: Aug. 23, 2016

(54) DEVICE AND PROCESS TO PREVENT PET FECES FROM TOUCHING GROUND

(71) Applicant: Jasmine Keiko Nakamura Brasuel, Agana, GU (US)

(72) Inventor: Jasmine Keiko Nakamura Brasuel, Agana, GU (US)

( * ) Notice: Subject to any disclaimer, the term of this patent is extended or adjusted under 35 U.S.C. 154(b) by 0 days.

(21) Appl. No.: 14/835,357

(22) Filed: Aug. 25, 2015

(65) Prior Publication Data

US 2016/0050885 A1    Feb. 25, 2016

Related U.S. Application Data

(60) Provisional application No. 62/041,605, filed on Aug. 25, 2014.

(51) Int. Cl.
*A01K 29/00* (2006.01)
*A01K 23/00* (2006.01)

(52) U.S. Cl.
CPC .................................. *A01K 23/005* (2013.01)

(58) Field of Classification Search
CPC . A01K 23/005; A01K 1/0107; E01H 1/1206
USPC .......................................... 294/1.5; D30/162
See application file for complete search history.

(56) References Cited

U.S. PATENT DOCUMENTS

| | | | |
|---|---|---|---|
| 4,466,647 A | 8/1984 | Spevak | |
| 4,705,310 A | 11/1987 | Scripter | |
| 4,852,924 A * | 8/1989 | Ines | A01K 23/005 294/1.5 |
| 5,131,704 A | 7/1992 | Li | |
| 5,971,452 A | 10/1999 | Marymor et al. | |
| 6,386,606 B1 | 5/2002 | Marshall | |
| 6,942,264 B1 | 9/2005 | Mendez | |
| 7,090,268 B2 | 8/2006 | Borman | |
| 7,198,310 B1 * | 4/2007 | Lau | A01K 23/005 294/1.5 |
| 7,267,381 B2 | 9/2007 | Cafferty et al. | |
| 7,431,361 B2 * | 10/2008 | Pilas | A01K 23/005 294/1.5 |
| 7,618,073 B2 | 11/2009 | Casper | |
| 8,123,266 B1 | 2/2012 | Jone et al. | |
| 8,146,967 B1 * | 4/2012 | Brown | A01K 23/005 294/1.5 |
| 8,177,270 B2 * | 5/2012 | Chen | A01K 23/005 294/1.4 |
| 8,544,907 B2 | 10/2013 | Powell | |
| 8,632,109 B2 | 1/2014 | Zidulka et al. | |

* cited by examiner

*Primary Examiner* — Stephen Vu
(74) *Attorney, Agent, or Firm* — Martin E. Hsia; Keri Ann Krzykowski

(57) ABSTRACT

A device to prevent feces from a pet from touching the ground, comprising an extendable rod that extends freely to a fully extended position when the rod is pointed approximately 30 degrees downwardly. A catch ring is rotatably attached to the rod and can be frictionally fixed at a selected catch ring angle, so that the catch ring can rotate from a closed position parallel to and abutting against the rod, to a plurality of open positions and frictionally fixed in a selected one of the open positions. A bag can be draped across the catch ring to be retained on said catch ring. The user can extend the rod to the fully extended position and place said catch ring retaining said bag in an open position against the ground, and then press the catch ring against the ground to adjust the catch ring angle so that the catch ring (retaining the bag) is approximately flat on the ground. The bag retained in the catch ring can be slid along the ground to be under the pet before the feces is dropped.

4 Claims, 3 Drawing Sheets

DEVICE AND PROCESS TO PREVENT PET FECES FROM TOUCHING GROUND

RELATED APPLICATION

This application claims the priority of provisional U.S. patent application 62/041,605 filed Aug. 25, 2014.

TECHNICAL FIELD

One of the problems of walking a pet animal, specifically canines, is that there is no clean and convenient way to completely remove pet animal feces once it has touched the ground. This results in the age-old problem of canine feces left in yards, neighborhoods, sidewalks, streets, parks, beaches and other public and private areas, polluting the ground and environment. There is a great need for a solution to prevent pet animal feces from touching the ground.

BACKGROUND ART

U.S. Pat. No. 7,631,910 to Shalhoub, incorporated herein by this reference in its entirety for all purposes, discloses a portable dog waste collector comprising a telescoping arm with a waste receptacle oriented at an angle to the telescoping arm.

U.S. patent application Ser. No. 12/283,085 (Patent Application Publication 20090102211 A1) to Antar, incorporated herein by this reference in its entirety for all purposes, discloses a portable pet waste receptacle having a telescoping handle member adjustable in length.

U.S. Pat. No. 7,407,207 B2 to Yilmaz, incorporated herein by this reference in its entirety for all purposes, discloses a housing with an extendable frame for holding a bag, in which the frame can be shifted between an open configuration and a closed configuration.

U.S. Pat. No. 8,684,429 to Holub, incorporated herein by this reference in its entirety for all purposes, discloses a portable waste disposal tool using recycled plastic merchandise bags secured to a frame by an adjustable tensioning bag clamp.

U.S. Pat. No. 8,066,311 B2 to Axelrod, incorporated herein by this reference in its entirety for all purposes, discloses a device for retrieving animal feces including a handle portion and a scoop or rake portion having a surface. A portion of the surface of the scoop and/or rake portion exhibits a coefficient of friction less than or equal to 1.0 and a contact angle of 90 degrees or greater.

U.S. Pat. No. 3,885,266 to Nafziger, incorporated herein by this reference in its entirety for all purposes, discloses a closeable disposable paperboard scoop.

U.S. Pat. No. 4,768,742 to Kaaloa, incorporated herein by this reference in its entirety for all purposes, discloses a plastisol coating on a frame to increase the coefficient of friction between the frame and a plastic trash bag.

DISCLOSURE OF INVENTION

The invention of a device for preventing pet feces from touching the ground comprises an extendable rod having a handle end and a distal end, where the rod extends freely to a fully extended position when pointed approximately 30 degrees downwardy. A catch ring is rotatably and frictionally fixably attached to the rod at the distal end, so that the catch ring and the rod define a catch ring angle. The catch ring can rotate from a closed position parallel to and abutting against the rod, to a plurality of open positions and be frictionally fixed in one of the open positions. A bag can then be draped across the catch ring to be retained on the catch ring. A user can extend the rod to the fully extended position and place the catch ring (retaining the bag) in an open position against the ground. Pressure applied against the ground can adjust the catch ring angle so that the catch ring (retaining the bag) is flat on the ground. The bag retained in the catch ring can be slid along the ground to be under the pet before the feces is dropped, so that the feces drops into the bag and is prevented from touching the ground Either lifting the catch ring also lifts the bag containing the feces (retained in the catch ring), so the bag can be grasped from the catch ring for disposal of the bag containing said feces, or lifting the catch ring leaves the bag containing the feces on the ground, so the bag can be picked up from the ground for disposal of the bag containing the feces.

Preferably, the rod retracts to a completely retracted position when the rod is pointed approximately 30 degrees upwardly.

Preferably also, a plastisol coating is applied to the catch ring.

The invention of a process for preventing feces from touching the ground comprises providing an extendable rod having a handle end and a distal end, wherein the rod extends freely to a fully extended position when the rod is pointed approximately 30 degrees downwardly, and a catch ring is rotatably and frictionally fixably attached to the rod at the distal end, whereby the catch ring and the rod define a catch ring angle, whereby the catch ring can rotate from a closed position parallel to and abutting against the rod to a plurality of open positions and frictionally fixed in a selected one of the open positions;

draping a bag across the catch ring to be retained on the catch ring when in a selected open position;

extending the rod to the fully extended position and placing the catch ring retaining the bag in an open position against the ground;

applying pressure against the ground to adjust the catch ring angle so that the catch ring retaining the bag Is flat on the ground;

sliding the bag (retained in the catch ring) along the ground to be under the animal before the feces is dropped;

whereby the feces drops into said bag and is prevented from touching the ground.

BEST MODES FOR CARRYING OUT INVENTION

Figures 1, 2A, 2B:
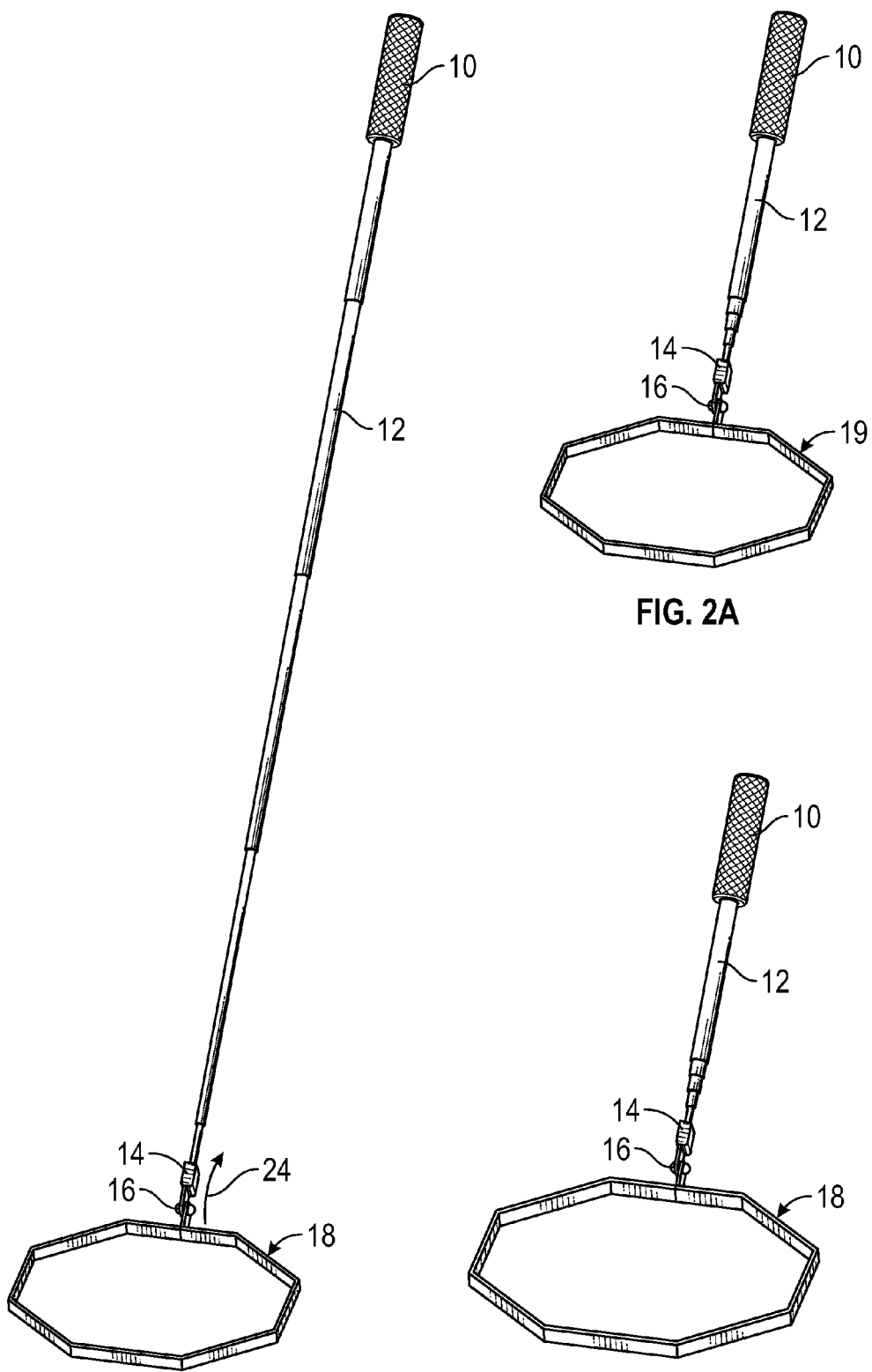
FIG. 1 is a perspective view from the front of a device according to the present invention, with all sections of the telescoping rod fully extended except the last, and the catch ring in an open position.
FIGS. 2A and 2B are two perspective views from the front of the device with all sections of the telescoping rod retracted and the catch ring in an open position, with FIG. 2A showing a 6" diameter catch ring and FIG. 2B showing an 8" diameter catch ring.

The purpose of this Invention is to make available a device of new use and design resulting in a unique method that will solve a long-existing problem of feces from animals, mainly canines, left on the ground, which soils the environment, footwear and bare feet. This device makes the collection and disposing of canine feces new, easy, sanitary and convenient and prevents ground contamination by animal feces. This device of new use and design is specifically designed for canines but can be utilized for the collection of other animals' feces as well.

The device of this invention prevents pet animal feces from touching the ground, thereby keeping the ground and other areas clean, including from feces remaining after dog owners have supposedly "cleaned up" after their animals and have left residual feces on the ground that cannot be seen to avoid. This device also eliminates the distasteful task of picking feces up off the ground and cleaning up after a pet animal. Previous methods and devices of clean up are inefficient and messy, making it necessary in some cases, to also have to clean your tools of clean up.

The device preferably includes an extendable rod (preferably by telescoping 5 cylindrical sections having successively smaller diameters that can nest inside each other), so that the rod's length when fully retracted is preferably approximately 15 inches long, which provides convenience in storage and carrying. Preferably, the diameters of successive cylinders are different enough that all sections fully extend the rod by gravity to approximately 55" in length when the rod is held at a downward angle of approximately 30 degrees, and all sections fully retract by gravity when the rod is held at an upward angle of approximately 30 degrees. When retracted, each section preferably fits into the next larger section, until all sections are stored in the largest section, which preferably has a contoured grip handle for comfort. This provides simplicity of operation, and avoids the complexity of prior art mechanisms.

A preferably circular catch ring is preferably connected to the distal end of the smallest diameter rod section by a mechanism, such as a hinge base cap having a diagonal tab and button-head rivets through the tab, to allow the catch ring to move to variable angles, including lying parallel to and abutting against the rod. Preferably, the mechanism allows the angle between the catch ring and the rod (the "catch ring angle") to be frictionally fixed, yet movable by pressure against the ground or by hand. In this application and claims, frictionally fixed includes ratchet, gear, toothed and other mechanisms that allow fixing of the catch ring at a desirable catch ring angle by pressing the catch ring against the ground or by hand. Although not preferred, frictionally fixed includes mechanisms that require additional separate tightening or other manipulation to fix the catch ring angle after the desired catch ring angle has been reached. Preferably, a light-weight plastic bag is draped over the rim of the catch ring to form a shallow bowl. This shallow plastic bag bowl "catches" the pet animal feces before it touches the ground, leaving the ground environment completely clean and free of pet animal feces pollution.

The device is used as follows: with the telescoping rod in its retracted position and the catch ring in the fully closed position, parallel to and abutting the rod, open the catch ring by pulling the catch ring out and away from the rod shaft, insert the plastic bag into the catch ring, placing the bottom of the plastic bag through the inside of the catch ring. The open end of the plastic bag is draped over the rim of the catch ring to form a shallow bowl within the catch ring, with most of the plastic bag draped over the catch ring rim. The device is now loaded with a bag and ready for use as described below, or the catch ring can be closed again for transportation, and opened again later when used. The simple loading of the device by draping the bag avoids the need to manipulate the bag to be retained by the clips or other mechanisms of the prior art.

Preferably, each section of the telescoping rod slides easily and smoothly to extend or retract so that simply pointing the rod upwards or downwards at an approximate 30 degree angle lets it slide to a longer or shorter length. The purpose for ease of extension and retraction is to allow the rod to extend and retract quickly, in a matter of seconds. The reason being, when a dog decides to squat, one must be able to quickly position the device to fulfill its function.

When the animal is ready to have a bowel movement, simply point the telescoping rod downward at an approximate 30 degree angle. The telescoping rod will extend smoothly and quickly Raiding the handle of the telescoping rod, place the catch ring on the ground. The catch ring angle between the rod and the catch ring can be adjusted by pressing the catch ring against the ground so that the catch ring is approximately flat on the ground. The catch ring (with the previously inserted bag) can then be slid along the ground under the rear end of the animal to catch the falling feces. Pressing the catch ring against the ground will automatically adjust the catch ring to be approximately flat on the ground, due to the friction fit of the preferred close fit rivet that allows the range of angular motion between the catch ring and the rod. The catch ring is now in position to catch the feces of the animal. The ability to adjust the catch ring angle pressing against the ground avoids the time needed to accurately calculate the correct catch ring angle to lay the catch ring flat on the ground under the animal based on the distance to the animal and the height of the handle from the ground. Avoiding the need to make this calculation is critical, because the time period between the animal stopping to have a bowel movement and the feces touching the ground is very short, only a matter of seconds, and the rod must be extended, and the catch ring and bag positioned beneath the animal, at the proper catch ring angle for the catch ring to be approximately flat on the ground under the animal, during this very short time period. This construction allows quick and easy reaction to the pet animal. Making the rod extendable and making the catch ring angle adjustable by pressing against the ground also avoids the need for the user to bend over or otherwise move his or her body in order to place the bag in proper position: approximately flat on the ground under the pet, if the bag filled with feces is retained in the catch ring, the user does not need to bend over to pick up the bag either. Because the rod is extendable, the user does not need to be close to the animal. Also, because the user lowers the rod approximately 30 degrees, the rod does not necessarily extend to its greatest length before extension is stopped by reaching the ground, and the user can then press the catch ring against the ground to adjust the catch ring to be approximately flat on the ground. The device therefore can be used at varying lengths, which allows the user to use the device at varying distances from the pet, or with varying heights from the handle to the ground, which allows different users with different heights to use the device, such as adults of different heights, or children and adults.

After collecting the dog feces in the bag, simply lift the catch ring off the ground. The plastic bag will either (1) stay in the catch ring, in which case the bag can be grasped from the bottom and pulled downward off the catch ring and tied and thrown away, or (2) stay on the ground when the catch ring is lifted because of the weight of the feces, in which case the outside of the bag is lifted from the ground and can be grasped, tied, and thrown away. In either case, the user only needs to touch the outside surface of the bag, which never touched the feces, and never needs to touch the inside surface of the bag, which may have contacted the feces, unlike other devices which require manipulation of the bag to release it from the mechanism that was retaining the bag in the device. Once its function has been fulfilled, the telescoping rod can then be returned to its retracted size quickly for convenient transportation and storage by pointing the rod and catch ring end upward by an approximate 30 degree angle so that all sections slide easily back to the retracted position. The catch ring can then be closed by pushing it back to rest flat against the rod in storage position.

The device remains clean and untouched by feces. The ground remains clean and untouched by feces. The dog owner remains clean and untouched by feces. The device itself is convenient to carry and store in its retracted state, with the catch ring in the closed position, and convenient and sanitary in use, and provides a solution to the long-standing problem of ground contamination by animal feces.

A device according to the present invention will now be described in more detail with reference to FIGS. 1-6 of the drawings.

Figure 4:
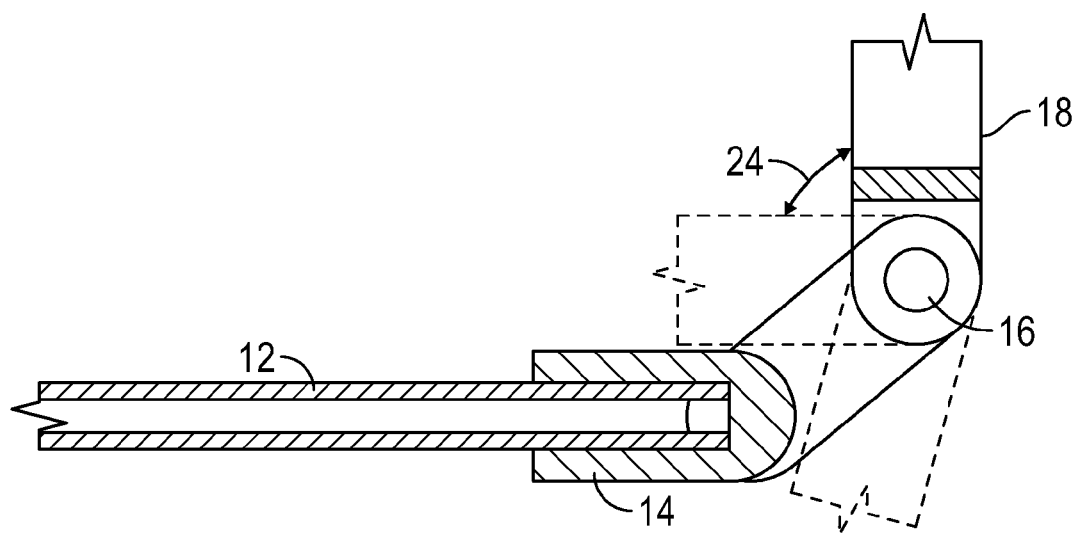
FIG. 4 is a side elevational view of the device with the telescoping rod shown horizontally, showing the hinge base cap which connects the rod to the catch ring, and a portion of the preferred range of motion allowed by the imbedded ¼" diameter close fit button head rivets.

Referring to FIG. 1, the device comprises a telescoping rod 12 with preferably foam (alternatively leather or molded plastic) handle 10 in five sections 12, 55" in length when fully extended, each section preferably of 3/64 inch chrome coated copper and of varying diameters. Preferably the handle 10 comprises a 5" handle of 1½" diameter, with foam cap covering. Although it is presently preferred that the sections are made of chrome coated copper tube, alternatively the sections can be made of fiberglass, plastic, or any other strong and durable material such as plastic, fiberglass, metal, wood, or graphite composite, with a coefficient of friction low enough that the rod will extend to its full length when tilted downward by approximately 30 degrees, and retract fully to its minimum length when tilted upwardly by approximately 30 degrees. Preferably, the section with the largest diameter—the handle rod section—comprises a rod section that has a diameter of approximately 1" and a length of approximately 12". Preferably the second rod section has a diameter of 7/8" and a length of approximately 10", providing a clearance between the first and second sections of approximately 0.003" between the sections, allowing the second rod section to fit into the handle rod section. Preferably the third section of the retractable rod has a diameter of approximately 3/4" and a length of approximately 10", providing a clearance between the second and third sections of approximately 0.003", allowing the third section to retract into the second rod section. Preferably the fourth section of the retractable rod has a diameter of approximately 5/8" and a length of approximately 10", providing a clearance between the third and fourth sections of approximately 0.003" allowing the fourth rod section to retract into the third rod section. Preferably the fifth section of the retractable rod has a diameter of approximately ½" and a length of approximately 6", providing, a clearance between the fourth and fifth sections of approximately 0.003", allowing the fifth rod section to retract into the fourth rod section. Preferably, as shown in FIG. 4, at the distal end of the fifth section 12, or smallest diameter section of there are not 5 sections), is a hinge base cap 14, preferably of chrome-plated copper (alternatively plastic), for the purpose of connecting the catch ring 18 to the smallest in diameter retractable rod 12, preferably by utilizing close-fit ¼" diameter button-head rivets 16 through a diagonal tab 15, as this allows the catch ring 18 a range of motion 24 and can be positioned to be frictionally retained at various angles in relation to the rod 12. The hinge base cap 14 with diagonal tab 15 is used to provide a strong, durable connection between the telescoping rod 12 and the catch ring 18 using the ¼" diameter close fit rivet 16, enabling a range of angular motion 24 of the catch ring 18 that at least allows the catch ring 18 to lay flat against the telescoping rod 12 (with a possible maximum range of angular motion shown by the positions in dotted line), but also a frictional fit to retain the catch ring at a selected angle.

The catch ring 18 is preferably a 1/8"×3/8" flat-band octagonal piece, preferably having a diameter of approximately 6 inches 19 or approximately 8 inches 18, as shown in FIGS. 2A and 2B. However, this is variable to larger than 8 inches or smaller than 6 inches to accommodate the size of dog breed and its feces. As an example, a Chihuahua would require a device with a catch ring approximately 6 inches 19 in diameter and a Rottweiler would require a device with a catch ring approximately 8 inches 18 or larger in diameter. Alternatively, the catch ring 18 can be of a circular or other polygonal shape.

Figure 3:
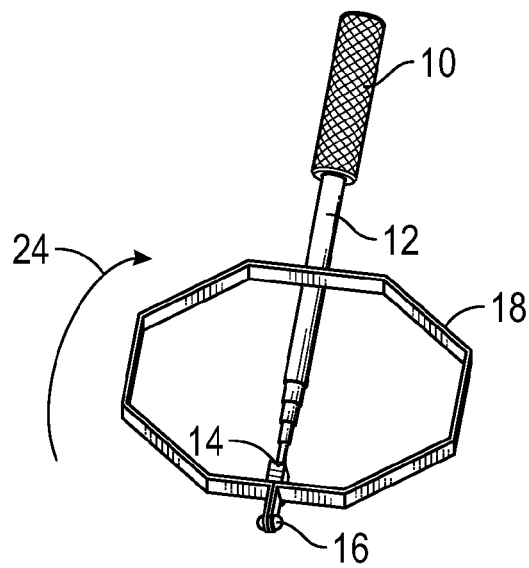
FIG. 3 is a perspective view from the front of the device with all sections of the telescoping rod retracted and the catch ring closed in its stored position, folded back to lie flat against the retracted rod.
Figure 6:
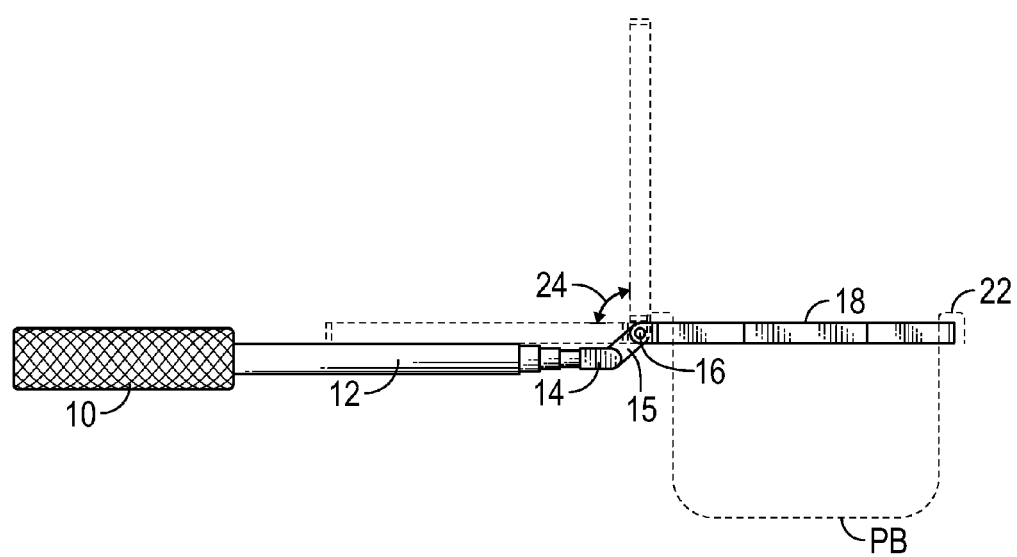
FIG. 6 is a side elevational view of the device with the telescoping rod shown horizontally and the telescoping rod in a retracted configuration, showing another preferred range of rotational motion of the catch ring between fully opened and fully closed, showing a plastic bag draped over the rim of the catch ring.

As shown in FIG. 3 and FIG. 6, the flat-band catch ring 18 is circular or polygonal in shape and can be rotated to the closed position, parallel to and abutting (folded flat against) the rod 12 when not in use, or extended out and frictionally held at a selected angle when partially or fully opened.

Figure 5:
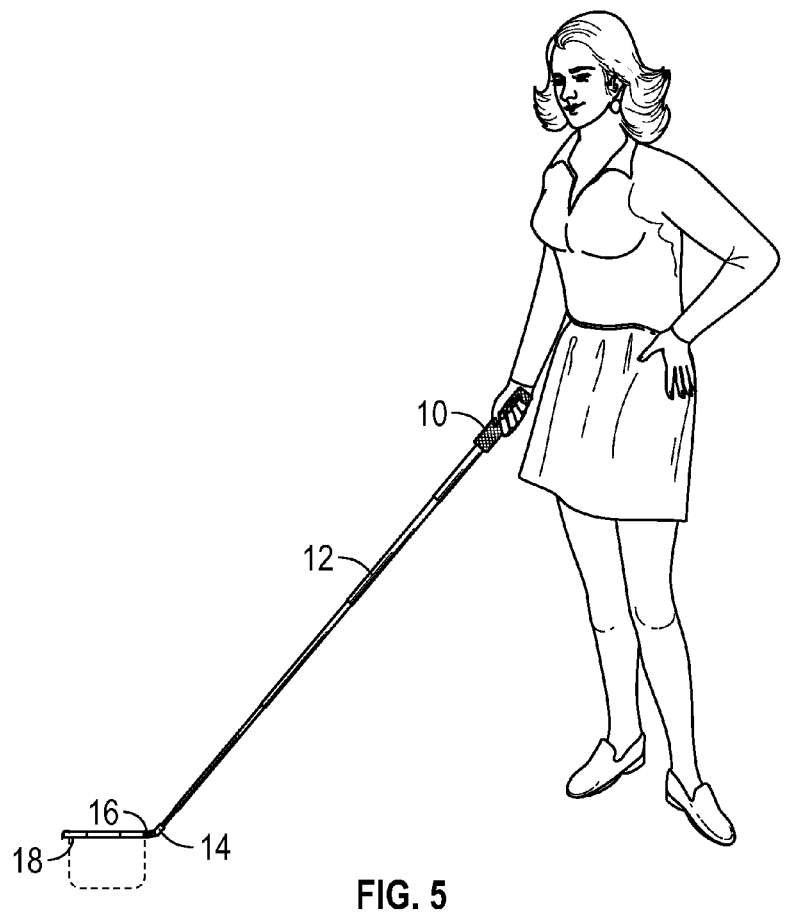
FIG. 5 is a side elevational view of the device with the telescoping rod extended and the catch ring adjusted to be approximately flat on the ground, for use by a person holding the Device.

As shown in FIG. 4, preferably, the close-fit ¼" diameter button-head rivet 16 connects the catch ring 18 to the hinge base cap 14 on the rod 12. This allows for varying the angle 24 of the catch ring in relation to the telescoping rod 12 in order to accommodate the height of the person using the device and the distance the person is from the animal, as shown in FIG. 5. The flat-band catch ring's 18 function is to hold a light-weight plastic bag PB of approximate 12"×12" dimensions which will "catch" the falling feces when the animal eliminates a bowel movement. The plastic bag PB is inserted into the catch ring 18 with the bag's open end over-lapping the catch ring's rim 22 to create a shallow bowl inside of the catch ring 18. This plastic bag PB catches the feces from the animal when placed directly under the rear end of the animal as it squats to eliminate feces and can be disposed of conveniently, in a sanitary manner without soiling or contaminating the ground, environment, device, or the pet animal owner.

The material of the telescoping rod can be plastic, fiberglass, metal, wood, graphite composite, or any strong and durable material that has a coefficient of friction low enough that, when given sufficient clearance around each telescoping section of the rod, the device will extend to full length and retract to minimum length, smoothly and easily when tilted at an approximate 30 degree angle downwards or upwards, respectively.

Alternatively, each telescoping rod section can be slightly tapered or of different diameters in order to fit into the preceding section of the rod with enough clearance to provide ease of movement.

The telescoping rod can consist of a number of sections greater than 5 or less than 5, 5 sections being the preferred number of specific lengths. The length of the extended telescoping rod can vary.

The rod can be non-telescoping of a specific adequate and functional length and include all other qualities of the telescoping device.

The grip area or handle can be molded plastic or have a foam covering or can be any material for comfort of grip. The handle diameter and design can vary in length and diameter.

The flat-band catch ring can be plastic, fiberglass, metal, wood, of graphite composition, or any strong and durable material. The catch ring itself can be flat band or rounded.

The shape of the catch ring is preferably circular but can be altered for marketability and uniqueness into other shapes including octagonal or square, which does not alter the function of the device.

The catch ring can also be covered with plastisol for the purpose of using plastisol's characteristics of color to differentiate the 2 preferable sizes of the catch ring and to add smoothness for aesthetics. The function of the device remains the same with the use of plastisol. The slight stickiness of plastisol can cause the plastic bags to adhere slightly to the catch ring when the bags are inserted into the catch ring, helping to keep the bag in place, and the plastisol does not inhibit the function of the device. The plastisol on the catch ring and various optional shapes of the catch ring add to the unique design of the device and do not alter the function, use or purpose of the Invention.

The hinge cap that connects the telescoping rod to the catch ring is preferably made of chrome-plated copper, however, other materials can be used such as plastic connectors.

A ¼" button-head rivet through a diagonal tab is presently preferably used to rotatably attach and frictionally fix the catch ring to the extendable rod, however, other structures may be used.

The device can use any non-leaking, pliable, light-weight plastic bag available that is of approximate 12"×12" size, as long as the plastic bag fits into the catch ring easily and conveniently and its open end can overlap and drape over the rim of the catch ring in order to stay in place.

This invention has been disclosed with respect to the particular preferred embodiments disclosed herein. However, it will be readily apparent to a person having ordinary skill in the art that many modifications and variations can be made to the disclosed preferred embodiments without departing from the scope and spirit of the invention. Accordingly, no limitations are to be inferred or implied in this patent except for those limitations that are specifically and explicitly set forth in the following claims.

INDUSTRIAL APPLICABILITY

This invention is applicable wherever it is desired to prevent pet feces from touching the ground.

What is claimed is:

1. A device to prevent feces from a pet from touching the ground, comprising:

an extendable rod having a handle end and a distal end, wherein said rod extends freely to a fully, extended position when said rod is pointed approximately 30 degrees downwardly;

a catch ring rotatably and frictionally fixably attached to said rod at said distal end, whereby said catch ring and said rod define a catch ring angle, whereby said catch ring can rotate from a closed position being parallel to and abutting against said rod to a plurality of open positions defining between 90 degrees to 180 degrees relative to the rod and frictionally fixed in a selected one of said open positions being 90 degrees relative to the rod;

whereby a bag can be draped across said catch ring to be retained on said catch ring when in a selected open position;

whereby a user can extend said rod to said fully extended position and place said catch ring retaining said bag in an open position against the ground;

whereby the user can press said catch ring against the ground to adjust said catch ring angle so that said catch ring retaining said bag is approximately flat on the ground;

whereby said bag retained in said catch ring can be slid along the ground to be positioned under said pet before said feces is dropped; whereby said feces drops into: said bag and is prevented from touching the ground;

whereby the user can lift said catch ring to lift said bag containing said feces retained in said catch ring, so said bag can be grasped from said catch ring for disposal of said bag containing said feces, or the user can lift said catch ring to leave said bag containing said feces on the ground, so said bag can be picked up from the ground for disposal of said bag containing said feces.

2. A device according to claim 1, wherein:

said rod retracts to a completely retracted position when said rod is pointed approximately 30 degrees upwardly.

3. A device according to claim 1, further comprising:

a plastisol coating applied to said catch ring.

4. A process for preventing feces from a pet from touching the ground, comprising:

providing an extendable rod having a handle end and a distal end, wherein said rod extends freely to a fully extended position when said rod is pointed approximately 30 degrees downwardly, having a catch ring rotatably and frictionally fixably attached to said rod at said distal end, whereby said catch ring and said rod define a catch ring angle, whereby said catch ring can rotate from a closed position being parallel to and abutting against said rod to a plurality of open positions defining between 90 degrees to 180 degrees relative to the rod and frictionally fixed in a selected one of said open positions being 90 degrees relative to the rod;

draping a bag across said catch ring to be retained on said catch ring when in a selected open position;

extending said rod to said fully extended position and placing said catch ring retaining said bag in an open position against the ground;

pressing the catch ring against the ground to: adjust said catch ring angle so that said: catch ring retaining said bag is approximately flat on the ground;

sliding said bag retained in said catch ring along the ground to be under said pet before said feces is dropped;

whereby said feces drops into said bag and is prevented from touching the ground;

whereby lifting said catch ring also lifts said bag containing said feces retained in said catch ring, so said bag can be grasped from said catch ring for disposal of said bag containing said feces, or lifting said catch ring leaves said bag containing said feces on the ground, so said bag can be picked up from the ground for disposal of said bag containing said feces.

* * * * *